United States Patent Office 3,341,604
Patented Sept. 12, 1967

3,341,604
COLOR STABLE KETONE SOLVENT COMPOSITION
Joseph R. Quelly, Fanwood, N.J., assignor to Esso Research and Engineering Company, a corporation of Delaware
No Drawing. Filed Jan. 28, 1963, Ser. No. 254,500
4 Claims. (Cl. 260—593)

This invention relates to the stabilization of lower alkyl ketones. In particular this invention relates to novel compositions of matter comprising a lower alkyl ketone containing stabilizing amounts of ascorbic acid. Still more specifically in a preferred embodiment this invention relates to the stabilization of methyl ethyl ketone obtained by catalytic dehydrogenation of secondary alcohols, or in general ketones prepared by other means containing contaminants similar to those contained in ketones prepared by catalytic dehydrogenation processes.

Lower dialkyl ketones containing from 3 to 8 carbon atoms per alkyl group in accordance with one commercial method are prepared by the catalytic dehydrogenation of secondary alcohols. For example, methyl ethyl ketone may be produced by subjecting secondary butyl alcohol to temperatures of 600–960° F. in the presence of a Group II metal oxide preferably supported on a carrier. Other catalysts are also known to effect this reaction. Also, other dialkyl ketones may be produced by reacting corresponding secondary alcohols such as hexanol-2 which may be converted to methyl butyl ketone, pentanol-2 to methyl propyl ketone, pentanol-3 to diethyl ketone, etc. In commercial manufacturing plants the crude product as it comes from the dehydrogenation unit comprises major amounts of the desired ketone with minor amounts of the unreacted feed and by-product contaminants such as other lower molecular weight ketones and/or alcohols resulting from a certain degree of cracking within the reaction vessel. Water may also be present in the crude reaction mixture. The ketone is then fractionally distilled to obtain a substantially pure product. Various techniques for fractional distillation are employed including the use of water which aids in the separation of the ketone from the corresponding alcohol. When water is employed in substantial amounts the process is described as an extractive distillation which, for example, may result in recovering the aqueous unreacted alcohol as a bottoms extract and the relatively pure ketone as an overhead raffinate from the extractive distillation unit. The particular manner in which the ketone is purified is not important to the successful operation of the present invention. Ketones are, however, well known commercial solvents which in accordance with consumer demand must have an extremely high purity. Typical minimum specification for methyl ethyl ketone will run about 99.4%. In order to meet the standards required, these ketones must be substantially colorless, i.e., water white, and have a low acid number of, for example, <0.002. The term "acid number" as employed herein refers to grams of acid per hundred grams of sample, the acid being calculated as acetic acid. Standard alkali titration techniques are employed to determine this acid number. Other processes for the production of ketones may lead to a product contaminated with impurities which will render the product subject to degradation.

Despite the high purity product which is obtained by extensive and elaborate fractionation techniques, it has been found that storage of the high purity ketone results in the formation frequently of color bodies such as yellow, amber, green and brown. These color bodies cause the specified water white liquid product to assume usually a yellow color. Since discolored ketones are objectionable to the consumer such discolored products would normally require extensive refinishing techniques before they could be sold. It has now been found that the acid number also often increases in storage to a point where it no longer meets specification. This also requires extensive and costly refinishing steps. The particular mechanism for this degradation of product and/or increase of acidity is not known; however, it is believed that the particular contaminants present in the high purity ketone catalyze in the presence of air the formation of diketones, e.g., 2,3-butanedione by oxidation of the high purity product ketone itself. This is extremely surprising in that text books on organic chemistry are in agreement to the effect that ketones are relatively stable towards oxidizing agents and in fact they will not reduce ammoniacal silver nitrates, gold salts or Fehling's solution. The degradation product formed on storage is ordinarily higher boiling than the ketone and can be separated from the ketone by fractional distillation. Obviously, the cost of the fractional distillation plus the cost of the product lost, e.g. up to about 10% bottoms, makes it especially desirous to avoid the formation of degradation product and to promote stabilization of the ketone. It is further believed that the contamination is also probably promoted by external contaminants introduced from the transportation and storage facilities, e.g. chloride and iron salts. In any event it is not intended to limit this invention by any theory of the mechanism involved, the surprising and effective improvement obtained being the invention now taught.

For a better understanding of the invention, reference is now had to Table I which sets forth the acidity and color of several different large samples of methyl ethyl ketone before and after storage. It will be noted from the table that the original acidity is less than about 0.002 and the original color approximately 0–5 Hazen. The acidity and color increased substantially on storage over 2 and 4 month periods.

TABLE I.—STORAGE STABILITY OF M.E.K.

| Sample | Original | | Time of Storage | After Storage | |
|---|---|---|---|---|---|
| | Acidity | Color | | Acidity | Color |
| A | 0.001 | 0 | 2 mos. (approx.) (Jan.–March) | 0.0061 | 30 |
| B | 0.0016 | 5 | 2 mos. (April–June) | 0.037 | 10 |
| C | 0.001 | 0 | 4 mos. (July–November) | 0.013 | 15 |

To further demonstrate the instability of high purity ketones, reference may be had to the following table which shows the results of an accelerated storage test on methyl ethyl ketone. It will be noted from the table that the original high purity product employed had an acid number below the specification maximum. The increase in acidity by air blowing in an accelerated storage test is shown. After only 7 hours the previously pure ketone contained an acid number which is unacceptable

TABLE II.—ACCELERATED STORAGE TESTS

| Sample No. | Time (With Air) | Acid Number |
|---|---|---|
| 3 | 0 | 0.0019 |
| 3 | 7 | 0.012 |
| 3 | 23 | 0.056 |
| 3 | 30 | 0.086 |
| 3 | 48 | 0.1124 |

The accelerated storage test is effected by boiling methyl ethyl ketone under reflux and at the same time bubbling air through the ketone for the number of hours set forth above at a rate of about 0.5 cubic ft./hr.

To demonstrate the effect of storage on color, a portion of ketone having the acidity of Sample A in Table I was subjected to the accelerated storage test and the color was determined after 2, 4, and 20 hours. Initial color on a Hazen scale was 0–5 or substantially water white. After 2 hours of refluxing with bubbled air, the color formed with a Hazen rating of 10; after 4 hours the color had a Hazen rating of 30; and after 20 hours the product turned greenish. Reference is now had to Table III which shows a relationship between acidity and color.

TABLE III

| Sample | Time of Heating (air) (hours) | Color [1] | Acidity |
|---|---|---|---|
| A | 0 | 0–5 | 0.0011 |
| A | 2 | 10 | 0.0099 |
| A | 4 | 30 | 0.0150 |
| A | 20 | [2] 30+ | 0.038 |

[1] Estimated Hazen ratings. The Hazen color scale is not an especially good technique for measuring color of stored methyl ethyl ketone. The eye can pick up differences more easily than the colorimeter. When methyl ethyl ketone goes off color in storage as measured by acidity, the Hazen colors are "no match." Sometimes they have a green cast, at other times yellow, brownish, etc. and the colorimeter cannot measure these differences. The color is therefore only an estimate and is not intended to reflect a true Hazen rating.
[2] Green.

To combat this apparent degradation by oxidation of ketones in storage, a number of known anti-oxidant-stabilizers were added in amounts which would normally be sufficient to stabilize an organic compound from oxidation. These inhibitors include Sustane, i.e., butyl hydroxy anisole ($C_{11}H_{16}O_2$), tocopherol, i.e. vitamin E ($C_{20}H_{50}O_2$), and tertiary butyl catechol ($C_{10}H_{14}O_2$). A sample of methyl ethyl ketone having a color rating of 0 and an acidity of 0.0004 was employed. The control was refluxed with air as described previously with a resulting increase in color to 5 and 10 after 7 and 14 hours and an increase in acidity to 0.0014 after 7 hours, and to 0.0120 after 14 hours. With Sustane after 7 hours the acidity was 0.0024 and the color was 50. With tocopherol the color was 30 and the acidity was above specification. With tertiary butyl catechol the color was also 30 and the acidity was up to 0.020. Other substance with poor inhibitory action are secondary and tertiary alcohols; water, and acetaldehyde had some but not outstanding inhibitory action. Sodium diethyldithiocarbamate and aluminum coupled to iron were inhibitors under certain conditions, but reproducible results could not be obtained. Propyl gallate, phosphoric acid, sodium nitrite, "Sustane," Dupont "Metal Deactivator," or "Tenamene-2" produce foreign color in MEK, and saccharin and triphenyl phosphite were completely ineffective. It is apparent therefore that the commercial anti-oxidants tried actually worsened both the acidity and color over the unstabilized control treated by refluxing with air over a similar period of time.

In accordance with this invention it has been found that ascorbic acid has an unexpected stabilization effect on lower alkyl ketones when added in very small parts per million. The amount added may be .0001 to 1 wt. percent, preferably 50 to 100 p.p.m., more preferably 5 to 30 p.p.m.

The present invention will be more clearly understood from a consideration of the following examples presenting data obtained in the laboratory and in the field.

EXAMPLE 1

Ascorbic acid was tested and found to be effective in stabilizing methyl ethyl ketone (MEK) in an accelerated storage test.

TABLE IV

| Additive | Additive Conc., p.p.m. | Rate of Diacetyl Formation, Percent of Reference [1] |
|---|---|---|
| Ascorbic acid [2] | 20 | 15 |
| None (reference) [1] | | 100 |
| Ascorbic acid [2] | 10 | 41 |
| None (reference) [1] | | 100 |

[1] Reference MEK product tested was color-unstable material taken from Tank 57 at Good Hope, La., in September. Tests were made at 80° C. for 16 hours under 10 p.s.i.g. oxygen pressure in the presence of tank-steel test piece.
[2] Added as aqueous solution, .01 vol. percent on MEK.

EXAMPLE 2

Ascorbic acid was used to stabilize methyl ethyl ketone and was found not to harm routine inspections of the product in tests shown below.

TABLE V.—ROUTINE INSPECTION CHARACTERISTIC OF MEK PRODUCT ARE NOT HARMED SIGNIFICANTLY BY ADDITIVES

| Inspection | Additive [1] | | Typical Commercial Specification |
|---|---|---|---|
| | None | Ascorbic Acid [2] | |
| Acidity, as HOAc, wt. percent | 0.001 | 0.001 | [3] 0.002 |
| Color, Pt-Co scale | 5 | 5 | [3] 10 |
| Dist'n. Temp., ° C.: | | | |
| Initial | 79.2 | 79.2 | [4] 78.6 |
| Dry Point | 79.7 | 79.7 | [3] 80.6 |
| Sp. Gravity, 20/20 c | 0.8060 | 0.8060 | 0.805–0.807 |
| Nonvolatile Matter, gram/100 ml | 0.0002 | 0.0004 | [3] 0.002 |
| Purity, as MEK wt. percent | 99.9 | 99.9 | [4] 99.3 |
| Water content, wt. percent | 0.05 | 0.04 | [3] 0.2 |

[1] Concentration of additive, 10 p.p.m. by wt.
[2] Added as aqueous solution, .01% solution in MEK.
[3] Max.
[4] Min.

EXAMPLE 3

This example presents results obtained in stabilizing methyl isobutyl ketone (MIBK) with ascorbic acid in the presence also of contaminants which accelerate the formation of impurities. The commercial MIBK used was prepared by the normal process of condensation of acetone to mesityl oxide followed by hydrogenation to MIBK and had a purity of above 99%.

TABLE VI.—PEROXIDATION OF MIBK IS CATALYZED BY DISSOLVED CHLORINE AND IRON IN THE PRESENCE OF STEEL, BUT INHIBITED BY ASCORBIC ACID

| Contaminants Added, p.p.m. | | Rate of Peroxidation, p.p.m. act. 0 per day [1] | Inhibitor Added [2] | Metal Present [3] | Rate of Diketone Formation, p.p.m. per day [4] |
|---|---|---|---|---|---|
| Chloride | Iron | | | | |
| 0.0 | 0.0 | 8.5 | None | Rusty steel | 10 |
| 1.5 | 0.0 | 21 | ---do--- | None | 14 |
| 1.5 | 0.0 | 26 | ---do--- | Clean zinc | 18 |
| 1.5 | 0.0 | 43 | ---do--- | Rusty steel | 90 |
| 1.5 | 0.0 | 48 | ---do--- | Clean steel | 21 |
| 1.5 | 0.0 | 144 | Ascorbic acid | Rusty steel | 58 |
| 1.3 | 0.7 | 15 | None | Clean zinc | 77 |
| 1.3 | 0.7 | 28 | Ascorbic acid | Rusty steel | 49 |
| 1.3 | 0.7 | 137 | None | ---do--- | 86 |

[1] 50 ml. commercial MIBK, lots designation B, subjected to accelerated storage test heating in an ASTM-D 525 glass-lined bomb at 80° C. for 22–114 hours under 10 p.s.i.g. initial oxygen pressure. Increase in peroxide content determined by conventional analysis.
[2] Inhibitor concentration was 0.001% when added.
[3] Metal test piece was 16-gauge, 0.125 x 0.125 inch in size.
[4] Increase in diketone content (yellow color body) during test determined spectrophotometrically.

EXAMPLE 4

The data presented below present an actual storage test showing the effect of adding ascorbic acid with also data on the amount of peroxides and acidity formed.

TABLE VII.—DISCOLORATION AND PEROXIDATION OF AIR-SATURATED MIBK EFFECTIVELY INHIBITED DURING STORAGE AT 104° F. IN CONTACT WITH RUSTY STEEL BY ASCORBIC ACID

| Test | Time, Days | Inhibitor Added | |
|---|---|---|---|
| | | None | 0.001% Ascorbic Acid |
| Diketone, p.p.m. (as diacetyl) [1] | 0 | 0 | 0 |
| | 7 | 24 | 4 |
| | 15 | 32 | 26 |
| | 32 | 57 | 28 |
| Spectral Yellow Value [2] | 0 | 0 | 0 |
| | 7 | 14 | 0 |
| | 15 | 18 | 2 |
| | 32 | 27 | 16 |
| Peroxide, p.p.m. active 0 | 0 | 6 | 8 |
| | 7 | 21 | --- |
| | 15 | 38 | 40 |
| | 32 | 70 | 180 |
| Acidity, wt. percent as Acetic | 0 | 0.003 | 0.003 |
| | 32 | 0.001 | 0.006 |

[1] Diketone is yellow color body formed by autooxidation and is determined spectrophotometrically.
[2] Special yellow value is spectrophotometric interpolation of ASTM Platinum-Cobalt color. Maximum color current specified for MIBK product is 15.

It is to be understood that this invention is not limited to the specific examples which have been offered merely as illustrations and that modifications may be made without departing from the spirit of the invention.

What is claimed is:
1. A dialkyl ketone of 3 to 8 carbon atoms stabilized with 0.0001 to 0.5 wt. percent of ascorbic acid.
2. Methyl ethyl ketone stabilized with 0.0001 to 0.5 wt. percent of ascorbic acid.
3. Methyl isobutyl ketone stabilized with 0.0001 to 0.5 wt. percent of ascorbic acid.
4. Methyl isobutyl ketone stabilized with 5 to 25 p.p.m. of ascorbic acid.

References Cited

UNITED STATES PATENTS

| 2,212,831 | 8/1940 | Hoffmann et al. | 167—81 |
| 2,269,145 | 1/1942 | Culter et al. | 167—81 |
| 2,377,188 | 5/1945 | Schwenk et al. | 260—621 |
| 2,868,691 | 1/1959 | Porush et al. | 167—81 |
| 2,928,767 | 3/1960 | Gulesich et al. | 167—81 |

OTHER REFERENCES

Merck Index, 7th edition, p. 106 (1960), Merck and Co., publishers.

LEON ZITVER, *Primary Examiner.*

D. HORWITZ, *Assistant Examiner.*